(12) United States Patent
Padfield et al.

(10) Patent No.: US 7,949,181 B2
(45) Date of Patent: May 24, 2011

(54) SEGMENTATION OF TISSUE IMAGES USING COLOR AND TEXTURE

(75) Inventors: Dirk Ryan Padfield, Albany, NY (US); Manasi Datar, Karnataka (IN); Harvey Cline, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 999 days.

(21) Appl. No.: 11/770,323

(22) Filed: Jun. 28, 2007

(65) Prior Publication Data
US 2009/0003691 A1 Jan. 1, 2009

(51) Int. Cl.
*G06K 9/00* (2006.01)
*G06K 9/34* (2006.01)
*G06K 9/46* (2006.01)
*G06K 9/66* (2006.01)

(52) U.S. Cl. ........ 382/164; 382/162; 382/173; 382/190; 382/128

(58) Field of Classification Search .................. None
See application file for complete search history.

(56) References Cited

U.S. PATENT DOCUMENTS

| | | | | |
|---|---|---|---|---|
| 6,956,373 | B1 * | 10/2005 | Brown et al. | 324/309 |
| 7,043,474 | B2 * | 5/2006 | Mojsilovic et al. | 1/1 |
| 7,421,125 | B1 * | 9/2008 | Rees | 382/181 |
| 7,483,554 | B2 * | 1/2009 | Kotsianti et al. | 382/128 |
| 7,761,240 | B2 * | 7/2010 | Saidi et al. | 702/19 |
| 2006/0269111 | A1 * | 11/2006 | Stoecker et al. | 382/128 |

OTHER PUBLICATIONS

Xu, L. et al. "Segmentation of skin cancer image", Image and Vision computing 17 (1999), 65-74.*
Cheng, H.D. et al. "Color image segmentation: advances and prospects", Pattern Recognition 34 (2001), 2259-2281.*
Datar; Natural Scene Segmentation Based on Information Fusion and Hierarchical Self-Organizing Maps; Thesis of Master of Science in Computer Science; 63 pps.; Utah State University, 2005.
Bartels; Automated Microscopy in Diagnostic Histopathology: From Image Processing to Automated Reasoning; 214-223, 1997 John Wiley & Sons, Inc.; vol. 8.
Comaniciu; Cell Image Segmentation for Diagnostic Pathology; 23 pps.
Huang; From Quantitative Microscopy to Automated Image; 893-912; Journal of Biomedical Optics, vol. 9, No. 5; Sep./Oct. 2004.
Mattfeldt; Prediction of Prostatic Cancer Progression after Radical Prostatectomy Using Artificial Neural Networks: A Feasibility Study; 316-323; BJU International 1999.
Cline; Segmentation of Prostate Cancer Tissue Micro Array Images; 11 pps; GE Global Research; 2005GCR557, Nov. 2005 Public Class 1.
Wolfe; Using Nuclear Morphometry to Discriminate the Tumorigenic Potential of Cells; A Comparison of Statistical Methods; 976-988; Cancer Epidemiology, Biomarkers & Prevention, vol. 13, No. 6, Jun. 2004.

* cited by examiner

*Primary Examiner* — Samir A Ahmed
*Assistant Examiner* — Li Liu
(74) *Attorney, Agent, or Firm* — Fletcher Yoder

(57) ABSTRACT

The present techniques provide for the processing of color tissue images based on image segmentation. In an exemplary embodiment, the color and texture features of pixels in a tissue image are used to generate a matrix of feature vectors. A subset of feature vectors is selected from the matrix of feature vectors and a set of colors and textures are derived using the tissue image and the subset of feature vectors. An initial segmented tissue image is then generated from this set of colors and textures.

22 Claims, 8 Drawing Sheets

SEGMENTATION OF TISSUE IMAGES USING COLOR AND TEXTURE

BACKGROUND

The invention relates generally to the processing of color images, which may be used to assess tissue abnormality in a tissue image. In particular, the present techniques relate to the segmentation of color tissue images.

Digital microscopy has become increasingly important in pathology and morphology. Images of stained tissue slides may be obtained and used by pathologists to recognize abnormal tissue structures associated with cancer. For example, a prostate cancer diagnosis is typically established by histopathology using hematoxylin and eosin (H&E) stained tissue sections, which are evaluated by a pathologist to subjectively assess the cancer state or grade. A pathologist's assessment of the cancer stage may be based upon gland and nuclei distributions and morphological features observed in an image of the cancerous tissue and how these distributions and features differ from those of a normal tissue image. However, human pattern recognition may be time consuming and inefficient because of the number of new cancer cases each year and the limited resources, such as the number of pathologists available.

To improve throughput, tissue microarrays (TMA) may be used for pathology research. In this approach, tissue cores from different patients are embedded in a paraffin block and sliced to give multiple registered arrays. These multiple tissue cores are simultaneously processed to remove staining variability and to reduce labor. However, even after staining variability is removed, an accurate and efficient evaluation may still require segmentation of features of interest in the tissue slides. Image segmentation may generally involve splitting an image into several components and assigning each pixel in the image to a respective component. Specifically, segmentation may be useful for classifying tissue image elements, such as pixels or larger image structures, into useful groups or categories.

Manual segmentation of a tissue image may be extremely time intensive. Moreover, the manual analysis should be done by an expert pathologist, whose time is limited and valuable. Additionally, automated segmentation methods often result in inaccurately segmented images. In particular, current techniques for automated segmentation of images are often unsuitable for use on color images, such as stained images of tissue, due to the interdependence of the color components of each pixel. In addition, such automated segmentation techniques may be computationally intensive. Therefore, a more efficient image segmenting process for tissue images is desired.

BRIEF DESCRIPTION

In accordance with an exemplary embodiment of the present technique, a tissue image is analyzed to determine color and texture components for each pixel in the image. Each pixel of the image then has a vector of feature values that undergo a two-part self organized mapping (SOM) to produce a segmented image. The two-part SOM may be referred to as a hierarchical SOM, or HSOM. The first part of the HSOM selects a pixel feature vector and updates the feature vector of a closely matching pixel or computational unit of a second image or computational grid to resemble the feature vector of the selected pixel. The process is iterative through different pixel segments until all the pixel segments in the second image or computational grid have been updated. These updated values represent the dominant color and texture characteristics in the tissue image. The second part of the HSOM improves the dominant features further by learning from the dominant characteristics produced by the first part. The original tissue image, when processed using the two-part HSOM, yields a cohesively segmented image as the values of the tissue image pixels are updated to match the values of the previously updated pixels of the second image or computational grid. One advantage of using the HSOM is that each high dimensional data vector is mapped to a low-dimensional discrete value so that comparing the values implicitly contains comparison of the original distances. In one embodiment, similar color regions in the segmented image generated by the HSOM process are merged to create a segmented image with improved homogeneity within the regions.

In exemplary embodiments, this process needs no training set and no a priori knowledge (though such a priori knowledge may be used if available), as the only information needed for unsupervised clustering is the information within the image itself. Furthermore, this process also utilizes texture analysis to more clearly differentiate between useful tissue structures, and is robust in the presence of incomplete data. The resulting segmented image using the present technique is an accurately and clearly segmented image with no processing supervision.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
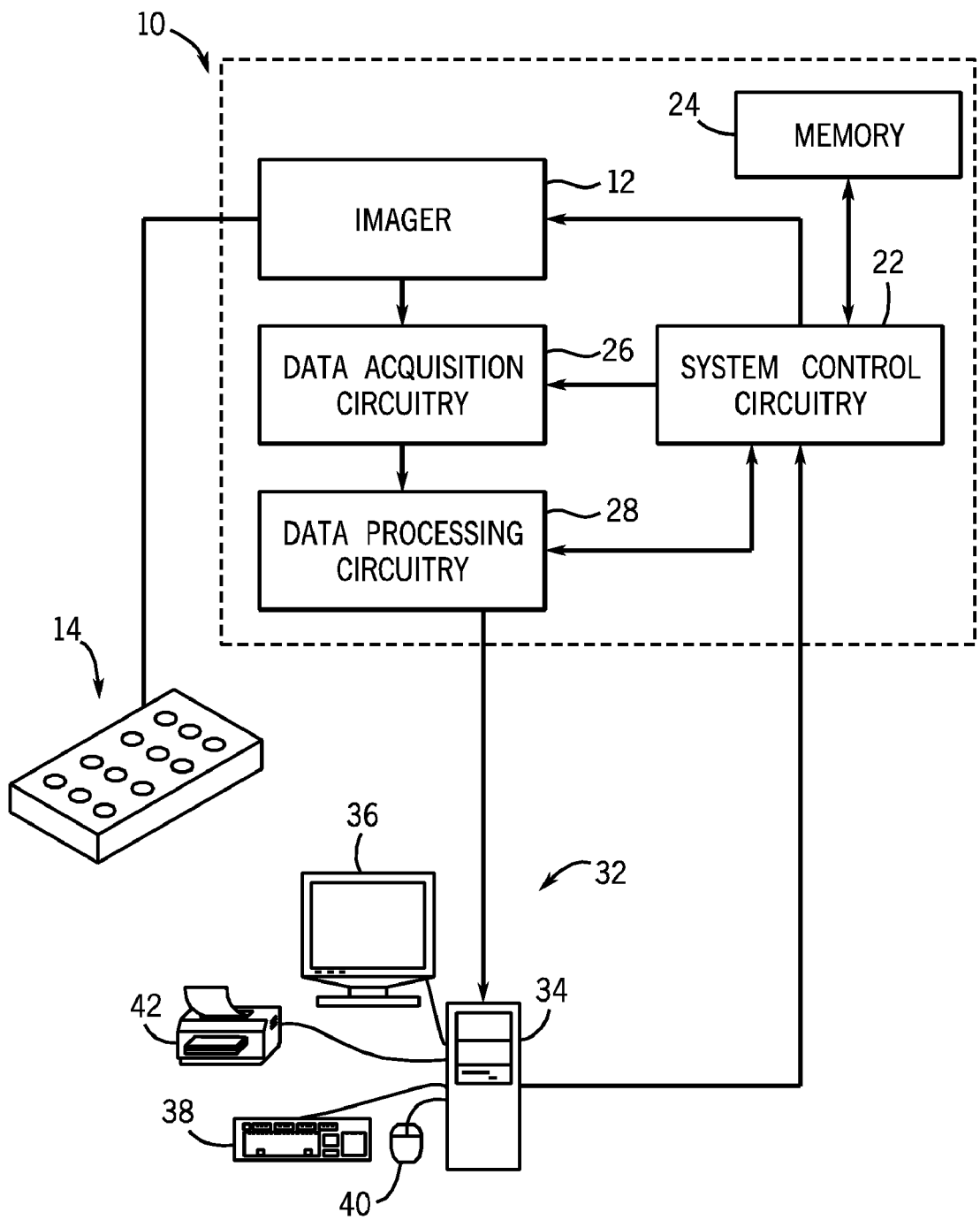
FIG. 1 is a diagrammatical view of an exemplary system for use in segmenting tissue images, in accordance with aspects of the present technique.

Embodiments of the present technique are generally directed to the unsupervised clustering and region merging of a color tissue image using color and texture features, resulting in the segmentation of useful tissue structures. This method leverages the advantages of unsupervised clustering, along with the use of multi-spectral features including texture. Being unsupervised means that the present technique requires no a priori knowledge (though such a priori knowledge may be used if available) about the image being segmented. It uses information within the given image to identify dominant clusters and does not require an extensive set of training images.

Additionally, in embodiments employing both color and texture, the use of texture features along with color features better enables the present technique to segment different tissue classes. While previous methods may have inaccurately classified spectrally similar tissue types, the use of texture features enables the present techniques to better separate useful tissue structures.

For example, in an exemplary implementation, the color and texture values of each pixel form the pixel's feature vector, and the feature vectors for all the pixels in the image form a feature matrix that is the input for unsupervised clustering. One embodiment of the present technique uses a two-stage hierarchical self-organizing map (HSOM) to provide a framework for unsupervised clustering. In one such implementation, the first stage of the technique employs a fixed-size two-dimensional map that captures the dominant color and texture features of an image in an unsupervised mode. The second stage combines a fixed-size one-dimensional feature map and color merging, to control the number of color clusters formed as a result of the segmentation. In such an embodiment, the HSOM may be seen as a pixel classifier in that a chosen subset of pixels from the image may be used to "learn" the underlying clusters, thereby obviating the need for a separate set of training images. Such a subset of pixels may either be selected based on sub-image statistics or in a sequential or random manner from the entire image. Though it may be difficult for any training set to capture variation present across all combinations of tissue and pathology, the present technique is advantageous in that it captures the variation in individual images and does not require a set of training images.

In one exemplary embodiment, the present technique may be implemented using an artificial neural network (ANN) or other competitive learning method. In such an ANN, the image component (such as a pixel or group of pixels) having an associated feature vector may be represented by a computational element, such as a neuron. In certain embodiments of the present technique, more than one neuron (or corresponding computational element) is allowed to learn each iteration, i.e., the winning neuron and those neurons determined to be in the neighborhood of the winning neuron may all participate in the learning process, leading to an ordered feature-mapping. Such an embodiment is in contrast to other competitive learning techniques where only the winning neuron is allowed to learn.

The segmentation of the image into tissue structures enables quantitative analysis and evaluation of the tissue disease state. For example, this can be done by extracting discriminate features from the segmentations that can be correlated with tumor staging scores (such as Gleason scores), which may lead to diagnostic information. A system incorporating such measures can be used as a second reader in a pathology examination. For example, once the pathologist has reviewed and scored the tissue, the pathologist's results can be compared with the automatic scoring to give further confidence to manual scoring. Further, in cases where the manual and automatic scores differ, the information from the automatic score can be used to give a potentially better score. The ability of such an automatic system to point out areas of the tissue that are potentially problematic can aid the pathologist to focus on areas that might have been missed.

Additionally, such a system can also be used to train new pathologists by showing a large number of images automatically quantified. Since new pathologists may require a large number of images during their training process, a large database of manually segmented images may be difficult to obtain. Thus, the unsupervised segmentation of images described herein may be useful for providing training images or establishing training databases.

With the foregoing in mind, an exemplary tissue image segmentation system 10 capable of performing the present technique is depicted in FIG. 1. Generally, the imaging system 10 includes an imager 12 that detects signals and converts the signals to data that may be processed by downstream processors. As described more fully below, the imager 12 may operate in accordance with various physical principles, such as optical principles, for creating the image data. In general, the imager 12 generates image data, of any dimension, in a conventional medium, such as photographic film, or in a digital medium. Furthermore, in one embodiment, the imager 12 may provide some degree of magnification while in other embodiments the imager 12 provides little or no magnification. For example, in one implementation, the imager 12 may be a microscope, such as a high-throughput microscope, suitable for image and/or video acquisition under magnification at suitable light wavelengths (such as visible, infrared, and/or ultraviolet light wavelengths). For instance, the imager 12 may be any suitable imaging device, including a fluorescence microscope, a confocal fluorescence microscope, a laser scanning confocal microscope, or a total internal reflection fluorescence microscope.

In the depicted embodiment, the imager 12 is configured to image a tissue section. The tissue section may be stained with hematoxylin and eosin (H&E) or some other stain or combination of stains suitable for viewing tissue sections. For example, in an exemplary implementation the tissue section is provided as a tissue microarray (TMA) 14, which is often used for high-throughput pathology research where multiple tissues are simultaneously processed to remove staining variability.

In one embodiment, the imager 12 operates under the control of system control circuitry 22. The system control circuitry 22 may include a wide range of circuits, such as circuitry controlling the emission of various types of electromagnetic radiation (such as visible, infrared, and/or ultraviolet light, X-rays, electron beams, and so forth) for use in the imaging process. Likewise, in some embodiments, the system control circuitry 22 may include timing circuitry, circuitry for coordinating data acquisition in conjunction with movement of a sample, circuitry for controlling the position of the imager 12 and/or the TMA 14, and so forth.

In the present context, the imaging system 10 may also include memory elements 24, such as magnetic or optical storage media, for storing programs and routines executed by the system control circuitry 22 and/or by associated components of the system 10, such as data acquisition circuitry 26 and/or data processing circuitry 28. The stored programs or routines may include programs or routines for performing all or part of the present technique.

In the depicted embodiment, data acquisition circuitry 26 is employed to acquire image data from the imager 12. In optical embodiments, the data acquisition circuitry 26 may be configured to acquire image data via one or more optical sensing elements, such as may be found in digital cameras, that are disposed on or in the imager 12 or in optical communication with the imager 12. The acquired image data may be digital or analog in nature. In embodiments where the initially acquired image data is analog in nature, the data acquisition circuitry 26 may also be configured to convert the analog data to a digital format. Likewise, the data acquisition circuitry 26 may be configured to provide some initial processing of the acquired image data, such as adjustment of digital dynamic ranges, smoothing or sharpening of data, as well as compiling of data streams and files, where desired.

The image data acquired by the data acquisition circuitry 26 may be processed, such as by data processing circuitry 28 in the depicted embodiment. For example, in certain embodiments, the data processing circuitry 28 may perform various transformations or analyses of the image data, such as ordering, sharpening, smoothing, feature recognition, and so forth. Prior or subsequent to processing, the image data may be stored, such as in memory elements 24 or a remote device, such as a picture archiving communication systems or workstation connected to the imaging system 10, such as via a wired or wireless network connection.

The raw or processed image data may, in some embodiments, be provided to or displayed on an operator workstation 32. In such embodiments, the operator workstation 32 may be configured to allow an operator to control and/or monitor the above-described operations and functions of the imaging system 10, such as via an interface with the system control circuitry 22. The operator workstation 32 may be provided as a general purpose or application specific computer 34. In addition to a processor, the computer 34 may also include various memory and/or storage components including magnetic and optical mass storage devices, internal memory, such as RAM chips. The memory and/or storage components may be used for storing programs and routines for performing the techniques described herein that are executed by the computer 34 or by associated components of the imaging system 10. Alternatively, the programs and routines may be stored on a computer accessible storage and/or memory remote from the computer 34 but accessible by network and/or communication interfaces present on the compute 34.

The computer 34 of the operator workstation 32 may also comprise various input/output (I/O) interfaces, as well as various network or communication interfaces. The various I/O interfaces may allow communication with user interface devices of the operator workstation 32, such as a display 36, keyboard 38, mouse 40, and/or printer 42, that may be used for viewing and inputting configuration information and/or for operating the imaging system 10. The various network and communication interfaces may allow connection to both local and wide area intranets and storage networks as well as the Internet. The various I/O and communication interfaces may utilize wires, lines, or suitable wireless interfaces, as appropriate or desired.

Though a single operator workstation 32 is depicted for simplicity, the imaging system 10 may actually be in communication with more than one such operator workstation 32. For example, an imaging scanner or station may include an operator workstation 32 used for regulating the parameters involved in the image data acquisition procedure, whereas a different operator workstation 32 may be provided for viewing and evaluating results.

For the purpose of explanation, certain functions and aspects of the present technique have been described as being separate and distinct or as being associated with certain structures or circuitry. However, such distinctions have been made strictly to simplify explanation and should not be viewed as limiting. For example, for simplicity, the preceding discussion describes implementation via a discrete imaging system 10 and operator workstation 32. As will be appreciated, however, certain functions described as being performed by the imaging system 10, such as data acquisition, data processing, system control, and so forth, may instead be performed on the operator workstation 32 or may have differing aspects, some of which are performed on the imaging system 10 and others of which are performed on the operator workstation 32. Indeed, in practice, virtually all functions attributed to the imaging system 10, with the possible exception of the functions attributed to the imager 12, may be performed on an operator workstation 32. In other words, the data acquisition circuitry 26, memory 24, data processing circuitry 28, and/or system control circuitry 22 may be provided as hardware or firmware provided in an operator workstation 32 and/or as software executable by the operator workstation 32. For example, some or all of the circuitry described herein may be provided as routines executed on a suitable processor or coprocessor of a computer 34 of an operator workstation 32. Indeed, it should be understood that the term circuitry, as used herein, encompasses dedicated or generalized hardware or firmware implementations and/or processor-executable software implementations suitable for implementing the described functionality.

Figure 2:
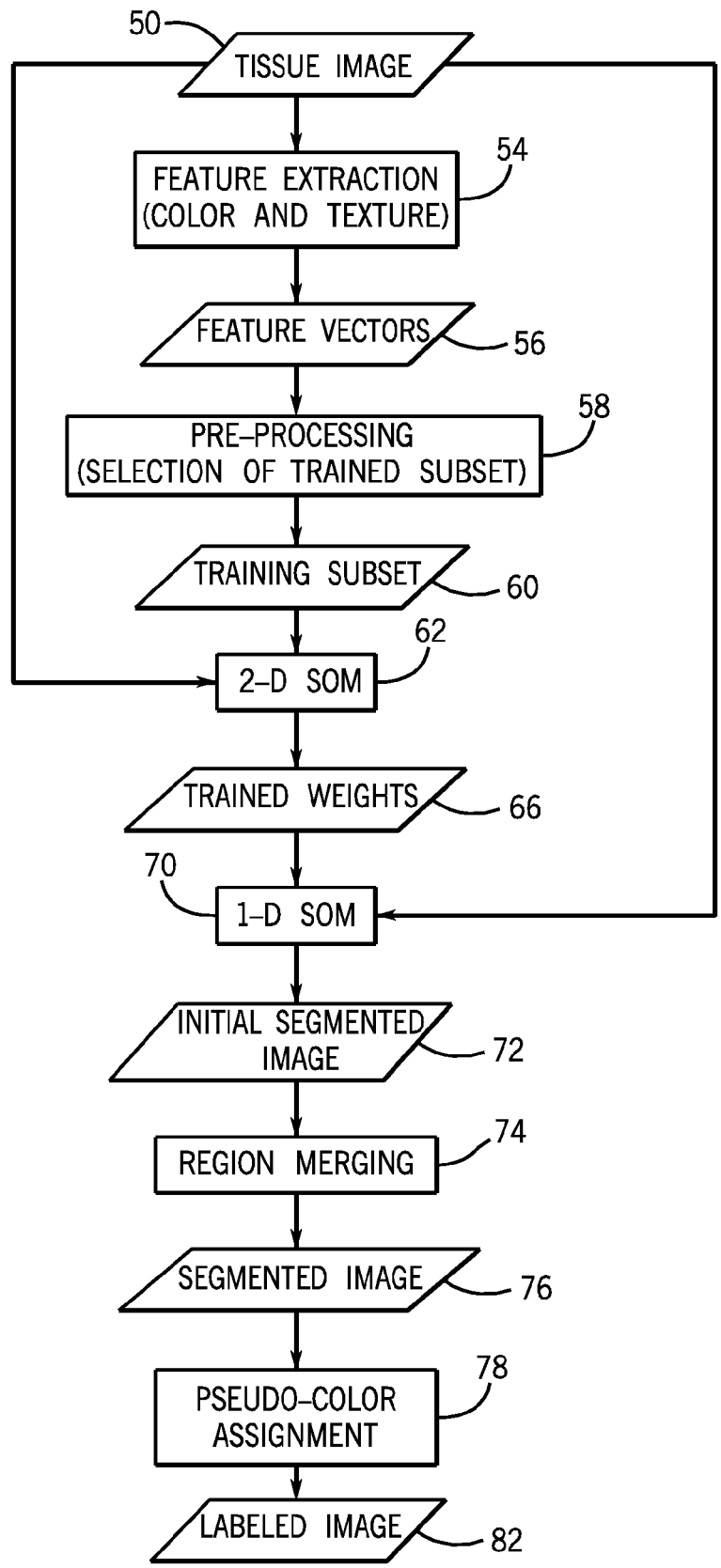
FIG. 2 is a flow chart depicting acts for segmenting a tissue image, in accordance with the present technique.
Figure 3:
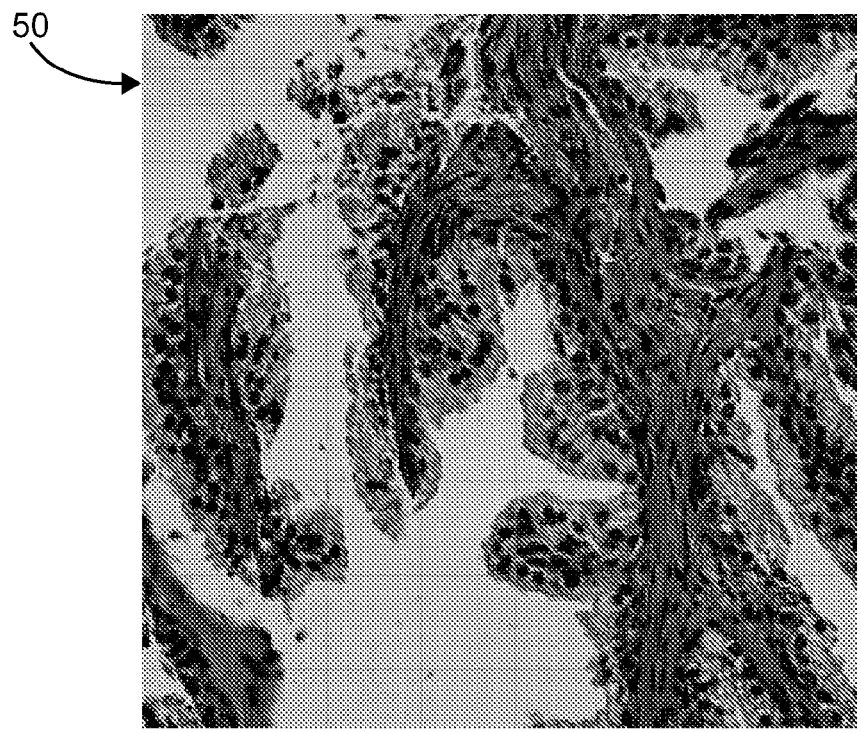
FIG. 3 depicts examples of tissue images in accordance with aspects of the present disclosure.
Figure 3:
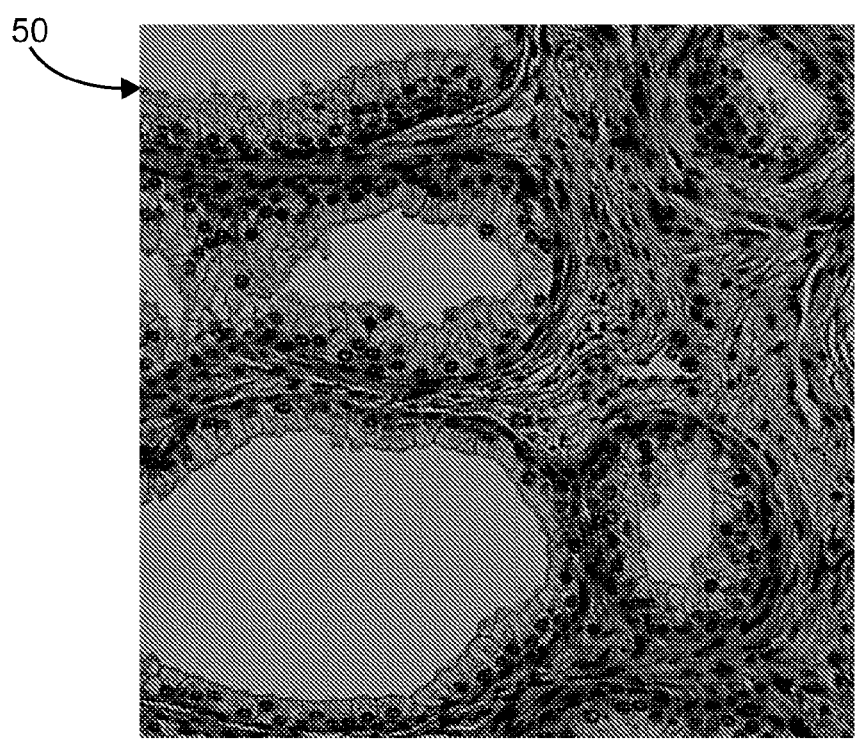

Keeping in mind the various devices and systems of FIG. 1, a flow chart depicting acts for segmenting a tissue image using such devices and systems is depicted in FIG. 2. In the depicted implementation, one or more tissue images 50, such as images of a TMA, undergo feature extraction (Block 54) where color and texture values are obtained for each pixel of the image 50 and represented as respective feature vectors 56 for the image pixels. Examples of tissue images 50 are provided in FIG. 3. The vectors 56 of all the pixels in tissue image 50 are pre-processed (Block 58) to select a training subset 60 of pixels for unsupervised clustering. The training subset 60 of pixels may be randomly selected or selected based on image features such as homogeneity. The training subset 60 is processed (Block 62) using a two-dimensional self-organizing map (SOM). Processing the training subset 60 using the two-dimensional SOM captures the dominant color and texture features of the training subset 60 and then iteratively determines the dominant color and texture features of all pixel subsets within the tissue image 50. Based upon this training process, a set of trained weights 66 is derived which represents pixel subsets in the tissue image 50 with updated values according to the dominant color and texture features determined from the training subset 60. The tissue image 50 is processed (Block 70) using a one-dimensional SOM and the trained weights 66 such that pixels of the tissue image 50 are updated based upon the closest updated pixel values found in the trained weights 66. The product of this updating HSOM process is an initially segmented image 72.

Figure 4:
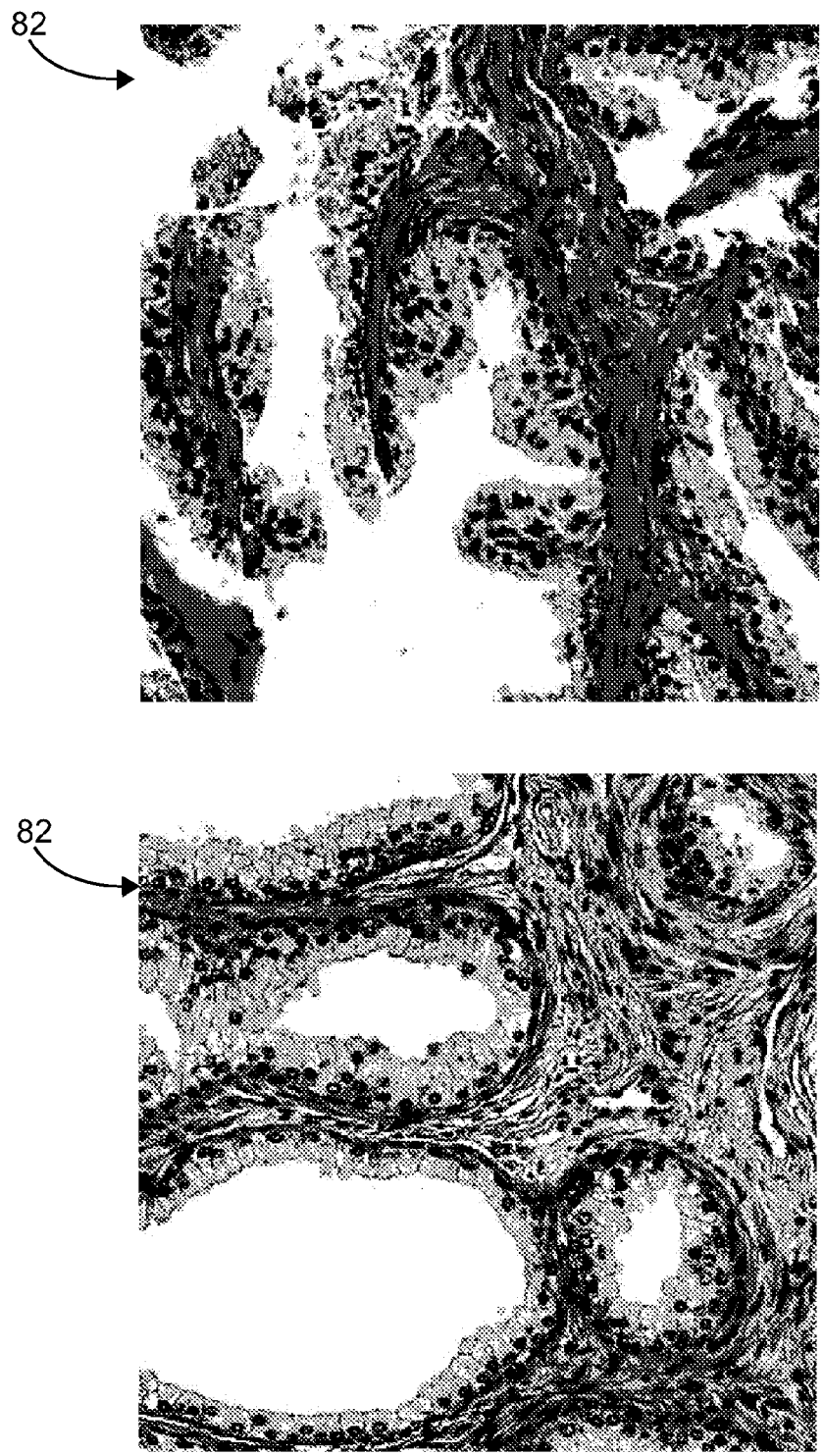
FIG. 4 depicts examples of labeled images in accordance with aspects of the present disclosure.

In some implementations, the initially segmented image is over-segmented. In such implementations, the initially segmented image 72 may undergo a region merging process (Block 74) by which the number of segments in the initially segmented image is reduced to arrive at a perceptually consistent segmentation in the form of a segmented image 76. The steps involved in different region merging methods will be further described below in the discussion of FIGS. 7 and 8. After region merging, the segmented image 76 will typically be more homogeneous within regions and have more disparity between the regions. In some implementations, to further ease visualization, the segmented image 76 may be recolored (Block 78) to produce a pseudo-colored and labeled segmented tissue image 82. Examples of pseudo-colored segmented tissue images 82 are provided in FIG. 4.

Figure 5:
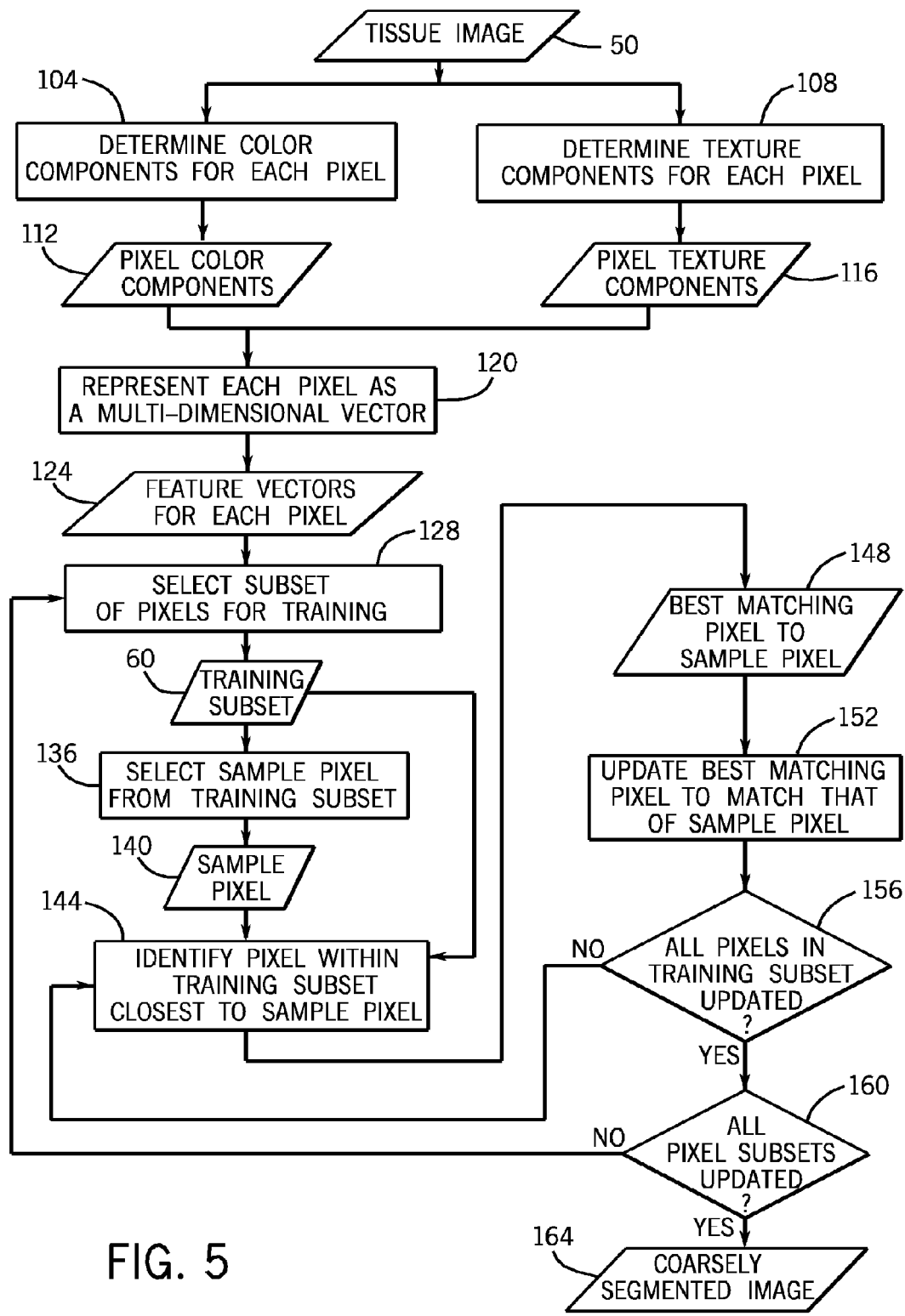
FIG. 5 is a flow chart of a training stage in a competitive learning method, in accordance with the present technique.

While the preceding provides a general overview of the present technique, a more detailed discussion of certain aspects of the present technique is discussed below. For example, a flow chart depicting feature extraction and the training stage, is provided in FIG. 5. Turning now to FIG. 5, feature extraction begins with determining (Block 104) the color components 112 and determining (Block 108) the texture components 116 for each pixel in a tissue image 50. In one implementation, the color components of a pixel may include R, G, B values, or other color values in accordance with another color standard. Determining the color component of each pixel (Block 104) provides pixel color components 112 for each pixel.

In an exemplary embodiment, the texture components are derived based on Laws' texture energy transforms where five simple one-dimensional filters (generally denoted as level, edge, spot, wave, and ripple) are convolved with the transposes of each other to provide a set of two-dimensional symmetric and anti-symmetric center-weighted masks. Four such masks are E5'L5, E5'S5, R5'R5, and L5'S5, where the letters correspond with one of the five filters. These masks are convolved with the tissue image 50 to produce a number of feature images that estimate the energy within the pass-band of their associated filters. Thus, Laws' texture energy transforms may effectively discriminate among texture fields. After the tissue image 50 is convolved with each useful mask to obtain corresponding texture energy images, each pixel in the tissue image 50 has a texture value for each of the masks it was convolved with, and these texture values are the respective pixel texture components 116 for each pixel. The pixel color components 112 and pixel texture components 116 are represented (Block 120) as a feature vector 124 for each pixel so that each pixel has a corresponding feature vector 124 which contain both color 112 and texture 116 components. The feature vector 124 of each pixel in the tissue image 50 form a matrix of feature values that is the input for unsupervised clustering.

From the matrix of feature vectors 124, a subset of pixels to be used for training is selected (Block 128) from the tissue image 50. The selection process may be random or sequential based on image features such as homogeneity or non-homogeneity. From this training subset 60, a sample pixel is selected (Block 136). The selection process for the sample pixel 140 may be random or based on image features such as homogeneity or non-homogeneity. The vector distances between the sample pixel 140 and the remaining pixels in the training subset 60 are calculated to identify (Block 144) the pixel within the training subset 60 with the closest vector distance to the sample pixel 140. This pixel is the best matching pixel 148 to that of the sample pixel 140. In one exemplary embodiment, the best matching pixel 148 (denoted below as $m_b$) to the sample pixel 140 (denoted below as x), out of every feature vector (denoted below as $m_i$) in the training subset 60, may be determined using the equation below:

$$\|x - m_b\| = \min_i \{\|x - m_i\|\}. \tag{1}$$

The best matching pixel 148 and its topological neighbors are moved closer (Block 152) to the input vector. In one exemplary embodiment, the process of moving the best matching pixel 148 and its topological neighbors closer to the input vector may be depicted in the equation below:

$$m_i(t+1) = m_i(t) + a(t)h_{bi}(t)[x - m_i(t)], \tag{2}$$

where t denotes time, a(t) is the learning rate and $h_{bi}(t)$ is a neighborhood kernel centered on x, the sample pixel. In one implementation, the learning rate a(t) and the neighborhood radius of $h_{bi}(t)$ decrease monotonically with time. Because of the neighborhood relations, neighboring pixel values are pulled in the same direction as the best matching pixel 148 towards the sample pixel 140, so that pixel vectors of neighboring units resemble each other. Once all the pixels in the training subset 60 have been updated, as determined at decision block 156, and all the training subsets within the image have been updated (Block 160), the result is a coarsely segmented image 164 with all pixel subsets updated. In an exemplary embodiment, the weights of the pixels within the coarsely segmented image 164 tend to approximate the density function of the vector inputs obtained from the image in an orderly manner.

Figure 6:
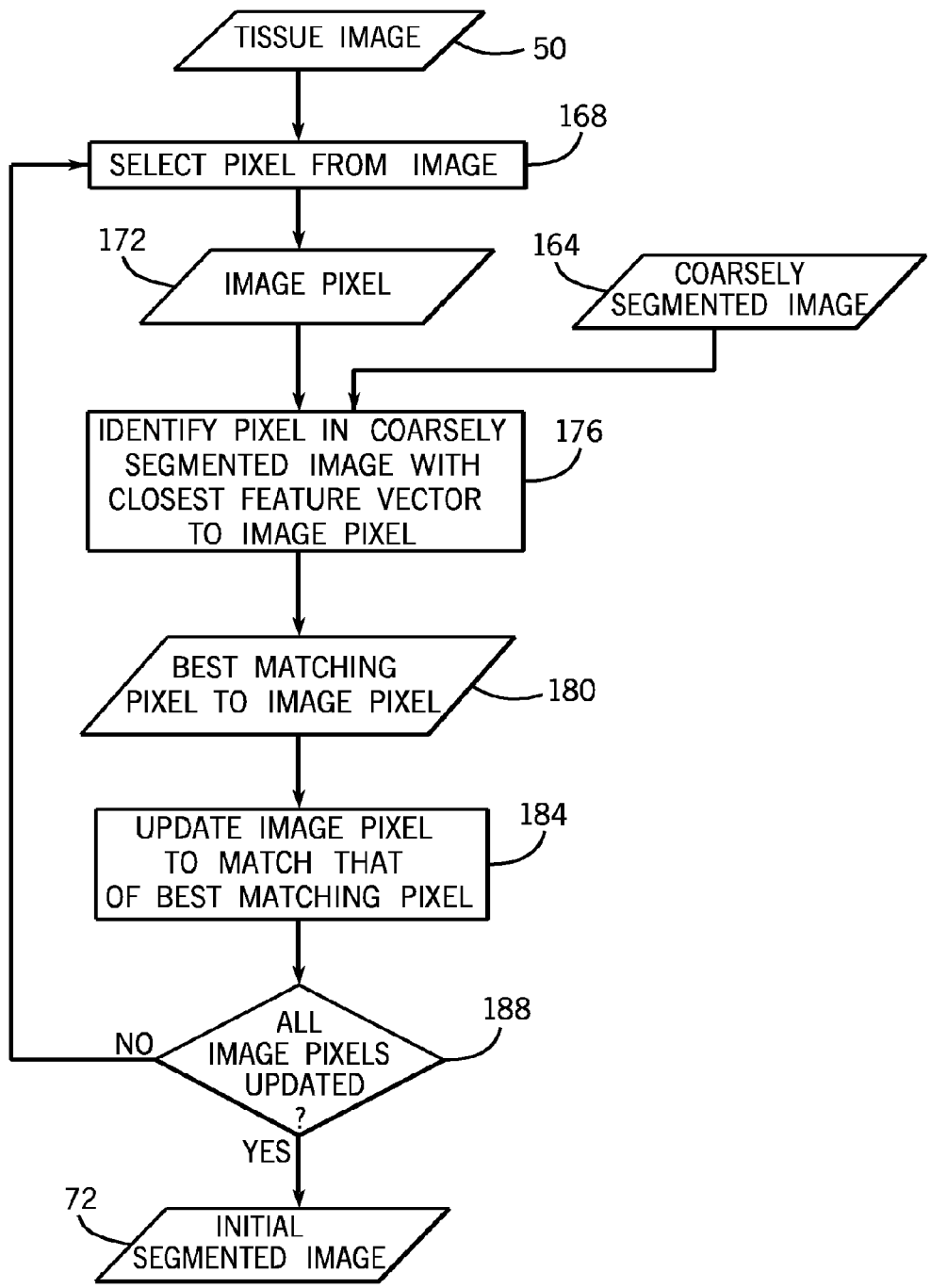
FIG. 6 is a flow chart depicting acts for segmenting an image using a trained weight output, in accordance with the present technique.

Turning now to FIG. 6, a flow chart depicting acts for segmenting the tissue image 50 using the coarsely segmented image 164 is given. The coarsely segmented image 164 is a two-dimensional map, such as a 10×10 map, that is utilized in the subsequent one-dimensional SOM, such as a 1×20 SOM. Dominant features in the two-dimensional map depicted as a coarse segmented image 164 are represented in the one-dimensional array, and the most representative features are extracted from the tissue image 50, resulting in its segmentation. To use the dominant features found in the coarse segmented image 164, a pixel 172 from the original tissue image 50 is selected (Block 168). The selection process for image pixels 172 may be random or sequential or based on some feature characteristic. The feature vector of the presently selected image pixel 172 is analyzed and compared with the feature vectors of the coarse segmented image 164 to identify (Block 176) the pixel 180 with the closest feature vector to the image pixel 172. The image pixel 172 is then updated (Block 184) so that its feature vector corresponds to that of the best matching pixel 180. Once all the image pixels 172 have been updated, as determined at decision block 188, an initial segmented image 72 is produced.

Figure 7:
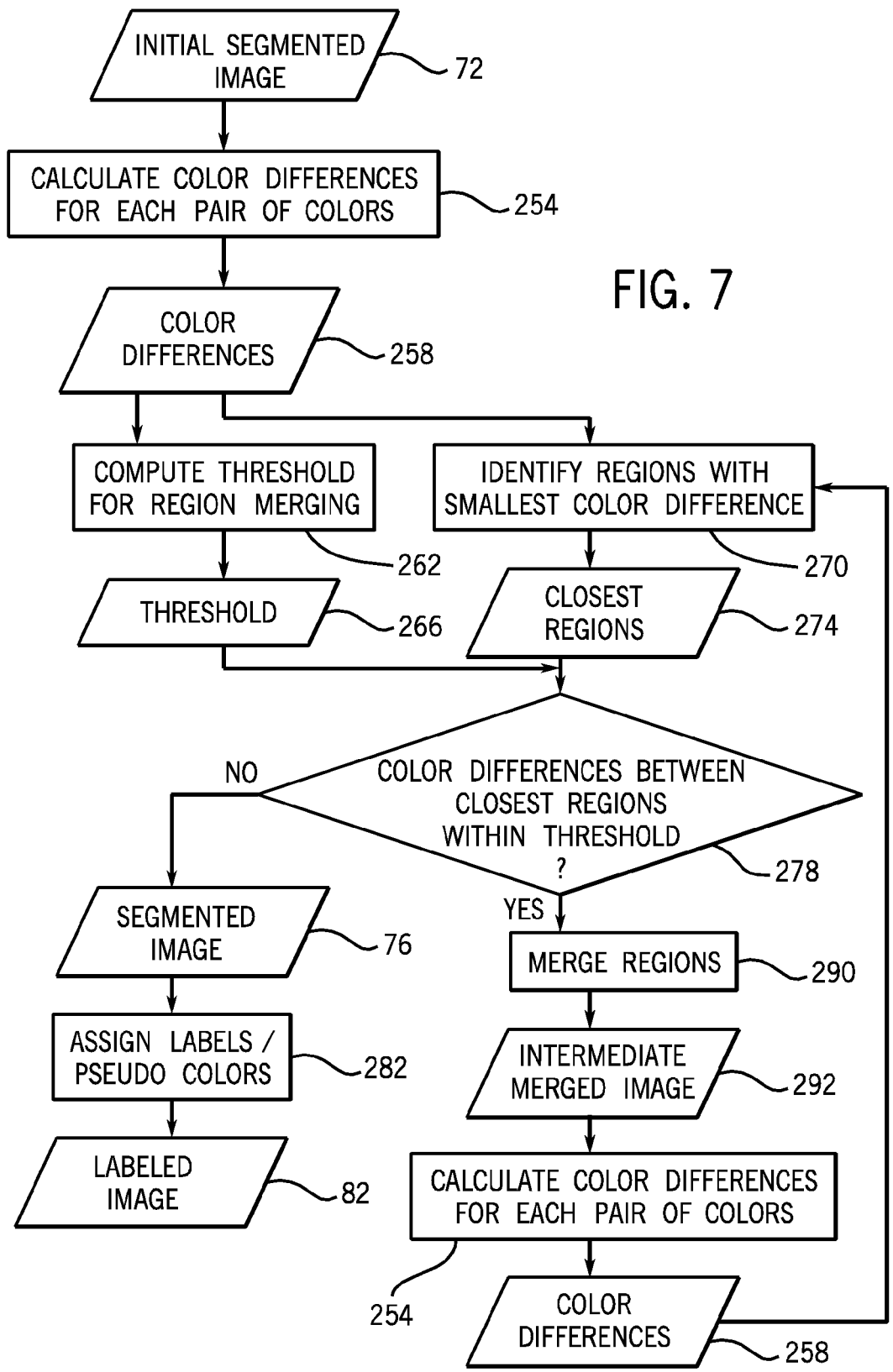
FIG. 7 is a flow chart depicting acts for region merging using a threshold standard, in accordance with the present technique.
Figure 8:
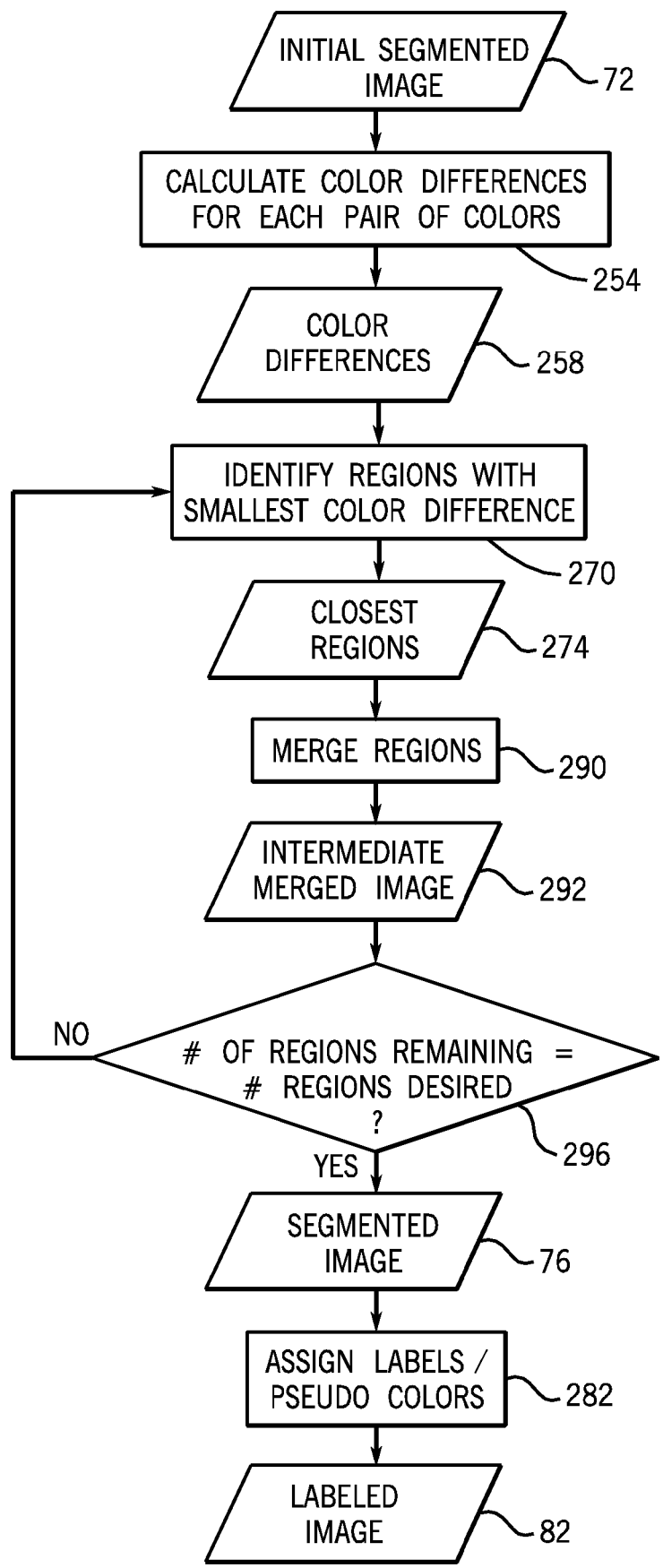
FIG. 8 is a flow chart depicting acts for region merging using a region number standard, in accordance with the present technique.

In certain exemplary embodiments, the initial segmented image 72 may undergo region merging, as discussed in FIGS. 7 and 8. In particular, colors obtained at the end of the two-dimensional SOM may be considered labels assigned by the classification scheme. Thus, similar but differently labeled color regions in the initial segmented image 72 correspond to the same useful tissue structures with similar initial feature vectors. Hence, in a competitive learning implementation, such similar color regions (represented as neurons or similar computational elements) can be merged to arrive at a perceptually consistent segmentation. In one embodiment, the merging is implemented using a suitable region-merging algorithm.

One such embodiment of region-merging using a threshold standard is depicted in the flow chart of FIG. 7. In the depicted exemplary technique, each of the colors present in the initial segmented image 72 represents a region. The color differences for each pair of colors are calculated (Block 254), resulting in a list of color differences 258. In one exemplary embodiment, the CIE (l*a*b*) color space may be used to calculate color differences 258 according to the equation:

$$\Delta E_{ab} = \sqrt{(\Delta l^*)^2 + (\Delta a^*)^2 + (\Delta b^*)^2}. \tag{3}$$

If the initial segmented image 72 had k colors, such as 20 colors where the initial segmented image 72 is the product of a 1×20 one-dimensional SOM, then the equation above will result in a list of k(k−1)/2 color differences. A threshold 266 for region merging is then computed (Block 262). In one embodiment, the threshold 266 (depicted below as $T_d$) may be computed by subtracting the standard deviation ($\sigma_v$) from the mean ($\mu_d$) of the list of color differences 258, as depicted in the equation below:

$$T_d = \mu_d - \sigma_v. \tag{4}$$

The threshold 266 may, in an alternative embodiment, be determined using any other method to determine whether two color regions are close enough to be merged. The depicted exemplary embodiment identifies regions with the smallest color difference (Block 270) and these closest regions 274 are compared (Block 278) with the threshold 266 to determine whether their color difference is within the threshold 266.

If the closest regions 274 do not have a color difference within the threshold 266, then region merging is complete. In the depicted exemplary embodiment, upon completion of the region merging, the resulting segmented image 76 may be recolored and labeled according to the recoloring (Block 282) to produce a pseudo-colored and labeled segmented tissue image 82.

If the closest regions 274 do have a color difference within the threshold 266, as determined at decision block 278, the closest regions 274 are merged (Block 290) to generate an intermediate merged image 292. Region merging of the closest regions 274 results in a new color region that, in one embodiment, has an intermediate value between the closest regions 274. For example, in one implementation, the new color region has a color that is the median or mean of the two merged colors, or alternatively, the mode of the two merged colors. As depicted, the regions 274 of the intermediate merged image 292 with the smallest color difference are identified (Block 270) and compared to the threshold 266 and so forth until merging is completed, i.e., the closest regions 274 are not within the threshold 266. In other words, in this exemplary embodiment, the merging process will occur so long as there are region pairs with color differences within the threshold 266.

FIG. 8 is a flow chart depicting acts for another embodiment of region merging using a region number target or goal. In this embodiment, the color differences 258 for each pair of color regions from the initial segmented image 72 are calculated (Block 254). Of the resulting color differences 258, the regions with the smallest color difference are identified (Block 270). These closest regions 274 are merged (Block 290) as described above. If, after this region merger, the number of regions remaining in the resulting intermediate merged image 292 is equal to the number of color regions desired, as determined at decision block 296, the intermediate merged image 292 is the segmented image 76. As described above, in certain embodiments the segmented image 76 may be recolored and labeled (Block 282) to produce a pseudo-colored segmented tissue image 82.

If after region merging (Block 290), the number of regions in the intermediate merged image 292 exceeds the target number of regions, the regions of the intermediate merged image 292 having the smallest color difference are identified (Block 270) so that these closest regions 274 can again be merged (Block 290). In this embodiment, region merging continues until the number of regions remaining in the image equals the target number of regions. For example, in one embodiment, the target number of regions may correspond to the number of useful or expected tissue structures to be differentiated in the segmented image 76. In an exemplary embodiment, where the segmented image 76 is expected to include nuclei, stroma, epithelial tissue, and glands, the number of useful tissue structures, or the number of regions expected, would be four. Thus, region merging under this embodiment would cease once four regions remained in the image. The target number of regions may also be greater than the number of useful tissue structures to be differentiated in the segmented image 76, as the desired image may also present different colors for the same tissue structure. The number of target regions may vary by application and may, for example, be two, three, four, five, six, and so forth up to the number of colors present in the initially segmented image 72.

As will be appreciated, though the discussion of the two exemplary techniques for region merging have been presented separately, both techniques may be employed in a single implementation. For example, in such an exemplary implementation, the logic of both techniques may be combined such that the region merging process continues until no more regions are within the threshold 266 or until the target number of regions is reached.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for processing a tissue image of stained tissue, the method comprising:
   generating a matrix of feature vectors, wherein each feature vector corresponds to a respective pixel of the tissue image and describes color and texture features of the respective pixel, wherein the stained tissue depicted in the tissue image is stained such that each color present in the stained tissue corresponds to a different tissue type;
   selecting a subset of feature vectors from the matrix of feature vectors;
   deriving a set of colors and textures using the tissue image and the subset of feature vectors; and
   generating an initial segmented tissue image using the set of colors and textures and the tissue image; and
   merging regions within the initial segmented tissue image to generate a final segmented image having a number of segments corresponding to the number of tissue types in the tissue image, wherein the number of segments is predetermined based on the number of different tissue types in the stained tissue.

2. The method as recited in claim 1, comprising extracting the color and texture features for each pixel of interest in the tissue image.

3. The method as recited in claim 1, wherein the color and texture features comprise three color features and four texture features.

4. The method as recited in claim 1, wherein deriving the set of colors and textures comprises performing a two-dimensional self organized mapping using the subset of feature vectors and the tissue image.

5. The method as recited in claim 1, wherein generating the initial segmented tissue image comprises performing a one-dimensional self organized mapping using the set of colors and textures and the tissue image.

6. The method as recited in claim 1, comprising assigning colors or labels to the segments of the final segmented image to generate a pseudo-colored or labeled image.

7. The method as recited in claim 1, wherein merging regions is iteratively performed until the predetermined number of segments remain.

8. The method as recited in claim 1, comprising performing an automatic pathology assessment of the initial segmented tissue image or the final segmented image.

9. The method as recited in claim 1, comprising establishing a training database using the initial segmented tissue image or the final segmented image.

10. The method as recited in claim 1, comprising training a pathologist or a CAD algorithm using the initial segmented tissue image or the final segmented image.

11. One or more non-transitory computer-readable media having a computer program comprising:
    a routine configured to generate a matrix of feature vectors, wherein each feature vector corresponds to a respective pixel of a tissue image and describes color and texture features of the respective pixel, wherein the stained tissue depicted in the tissue image is stained such that each color present in the stained tissue corresponds to a different tissue type;

a routine configured to select a subset of feature vectors from the matrix of feature vectors;

a routine configured to derive a set of colors and textures using the tissue image and the subset of feature vectors; and a routine configured to generate an initial segmented tissue image using the set of colors and textures and the tissue image; and a routine configured to merge regions within the initial segmented tissue image to generate a final segmented image having a number of segments corresponding to the number of tissue types in the tissue image, wherein the number of segments is predetermined based on the number of different tissue types in the stained tissue.

12. The one or more non-transitory computer-readable media as recited in claim 11, wherein the computer program comprises a routine configured to extract the color and texture features for each pixel of interest in the tissue image.

13. The one or more non-transitory computer-readable media as recited in claim 11, wherein the routine configured to derive the set of colors and textures performs a two-dimensional self organized mapping using the subset of feature vectors and the tissue image.

14. The one or more non-transitory computer-readable media as recited in claim 11, wherein the routine configured to generate an initial segmented tissue image performs a one-dimensional self organized mapping using the set of colors and textures and the tissue image.

15. The one or more non-transitory computer-readable media as recited in claim 11, wherein the computer program comprises a routine configured to assign colors or labels to the segments of the final segmented image to generate a pseudo-colored or labeled image.

16. The one or more non-transitory computer-readable media as recited in claim 11, wherein the routine configured to merge regions iteratively merges regions until the predetermined number of segments remain.

17. An image analysis system, comprising:
an imager configured to optically analyze a stained tissue sample wherein the stained tissue sample is stained such that each color present in the sample corresponds to a different tissue type;
data acquisition circuitry configured to acquire a tissue image of the stained tissue sample via the imager; and
data processing circuitry configured to generate a matrix of feature vectors, wherein each feature vector corresponds to a respective pixel of the tissue image and describes color and texture features of the respective pixel, to select a subset of feature vectors from the matrix of feature vectors, to derive a set of colors and textures using the tissue image and the subset of feature vectors, to generate an initial segmented tissue image using the set of colors and textures and the tissue image; and to merge regions within the initial segmented tissue image to generate a final segmented image having a number of segments corresponding to the number of tissue types in the tissue image, wherein the number of segments is predetermined based on the number of different tissue types in the stained tissue.

18. The image analysis system of claim 17, wherein the data processing circuitry is further configured to extract the color and texture features for each pixel of interest in the tissue image.

19. The image analysis system of claim 17, wherein the data processing circuitry is configured to derive the set of colors and textures by performing a two-dimensional self organized mapping using the subset of feature vectors and the tissue image.

20. The image analysis system of claim 17, wherein the data processing circuitry is configured to generate the initial segmented tissue image by performing a one-dimensional self organized mapping using the set of colors and textures and the tissue image.

21. The image analysis system of claim 17, wherein the data processing circuitry is configured to assign colors or labels to the segments of the final segmented image to generate a pseudo-colored or labeled image.

22. The image analysis system of claim 17, wherein the data processing circuitry is configured to merge regions iteratively until the predetermined number of segments remain.

* * * * *